US012738717B2

(12) United States Patent
Zhong et al.

(10) Patent No.: US 12,738,717 B2
(45) Date of Patent: Sep. 15, 2026

(54) ELECTRICAL BUSWAY ASSEMBLIES AND METHODS OF ASSEMBLING SAME

(71) Applicant: ABB Schweiz AG, Baden (CH)

(72) Inventors: Sheng Zhong, Raleigh, NC (US); Marius Rutkevičius, Raleigh, NC (US); Darren Dale Tremelling, Raleigh, NC (US)

(73) Assignee: ABB Schweiz AG, Baden (CH)

(*) Notice: Subject to any disclaimer, the term of this patent is extended or adjusted under 35 U.S.C. 154(b) by 275 days.

(21) Appl. No.: 18/337,811

(22) Filed: Jun. 20, 2023

(65) Prior Publication Data

US 2024/0429686 A1 Dec. 26, 2024

(51) Int. Cl.
*H02B 1/20* (2006.01)

(52) U.S. Cl.
CPC .................................... *H02B 1/205* (2013.01)

(58) Field of Classification Search
None
See application file for complete search history.

(56) References Cited

U.S. PATENT DOCUMENTS 3,346,687 A * 10/1967 Giger, Jr. ................. H02G 5/06 174/68.2
3,347,975 A * 10/1967 Shannon .................. H02G 5/06 174/70 B
3,504,103 A * 3/1970 Anderson ............. H02G 5/005 428/480
3,639,676 A * 2/1972 Dempsey, Jr. ........... H02G 5/06 174/68.3
3,662,088 A * 5/1972 Wright ................... H02G 5/005 174/117 FF
4,266,091 A * 5/1981 Fukuda .................. H02G 5/005 174/72 B
4,342,881 A * 8/1982 Fukuda .................... H05K 7/06 29/854
4,382,156 A * 5/1983 Jodoin ................... H02G 5/005 361/321.2
4,401,844 A * 8/1983 Fleuret ................. H05K 1/0263 361/309

(Continued)

OTHER PUBLICATIONS

Original and Translation of DE102009032242 (Year: 2011).*

(Continued)

*Primary Examiner* — Timothy J. Dole
*Assistant Examiner* — Muhammed Azam
(74) *Attorney, Agent, or Firm* — McCarter & English, LLP; Michael M. Gnibus

(57) ABSTRACT

An electrical busway assembly is provided. The electrical busway assembly includes a plurality of busbars having a length direction. Each busbar includes a conductor and a busbar insulator coating the conductor. The busway assembly further includes a bonding agent positioned between the plurality of busbars and bonding the plurality of busbars in the length direction. The bonding agent is configured to withstand an electromagnetic force caused by a current flowing through the plurality of busbars during a short circuit condition in the plurality of busbars. The plurality of busbars are coupled with one another without mechanical fasteners, and the busway assembly has a voltage rating in a low voltage range of 1000 Volts (V) or lower.

19 Claims, 10 Drawing Sheets

(56) References Cited

U.S. PATENT DOCUMENTS 5,854,445 A * 12/1998 Graham ................. H02G 5/007 248/68.1
6,302,987 B1 * 10/2001 Wojnarowski ......... H02G 5/005 156/286
6,444,911 B2 * 9/2002 Maruyama ............... H02G 3/16 174/70 B
7,557,298 B2 * 7/2009 Vanhoutte .......... H05K 7/14329 174/68.2
8,018,712 B2 * 9/2011 Yang ...................... H02G 5/005 361/328
8,711,549 B2 * 4/2014 Rodrigues ................ H02G 5/10 174/68.2
9,281,674 B2 * 3/2016 Walgenbach ............ H02G 5/06
10,790,643 B2 * 9/2020 Velthuis ................... H02B 1/21
10,907,268 B2 * 2/2021 Nakagawa .............. B32B 27/34
11,139,646 B2 * 10/2021 Koizumi .............. H01B 7/0018
11,935,717 B2 * 3/2024 Kraft ........................ H02B 1/21
2022/0140550 A1 * 5/2022 Kim ....................... H01R 43/20 174/68.2
2023/0163584 A1 * 5/2023 Voski ....................... H02G 5/10 174/16.2
2024/0283234 A1 * 8/2024 Ozturk ..................... H02G 5/06

OTHER PUBLICATIONS

Original and Translation of KR20170014914 (Year: 2017).*
Original and translation of DE10321424 (Year: 2003).*
Original and translation of EP0174777 (Year: 1986).*
Starline Track Busway, “Installation, Operation and Maintenance Manual T1 Series,” Mar. 23, 2018, pp. 1-56, Starline, Canonsburg, PA.
Eaton, “Design Guide, Low-Voltage busway-Pow-R-Way III,” Feb. 2020, pp. 1-53, DG017002EN 24.1-2, Eaton, Cleveland, OH.
Siemens, “Siemens—Busway purpose and definition,” Dec. 23, 2010. [Online]. Available: https://electrical-engineering-portal.com/siemens-busway-purpose-and-definition. [Accessed Nov. 22, 2021].

* cited by examiner

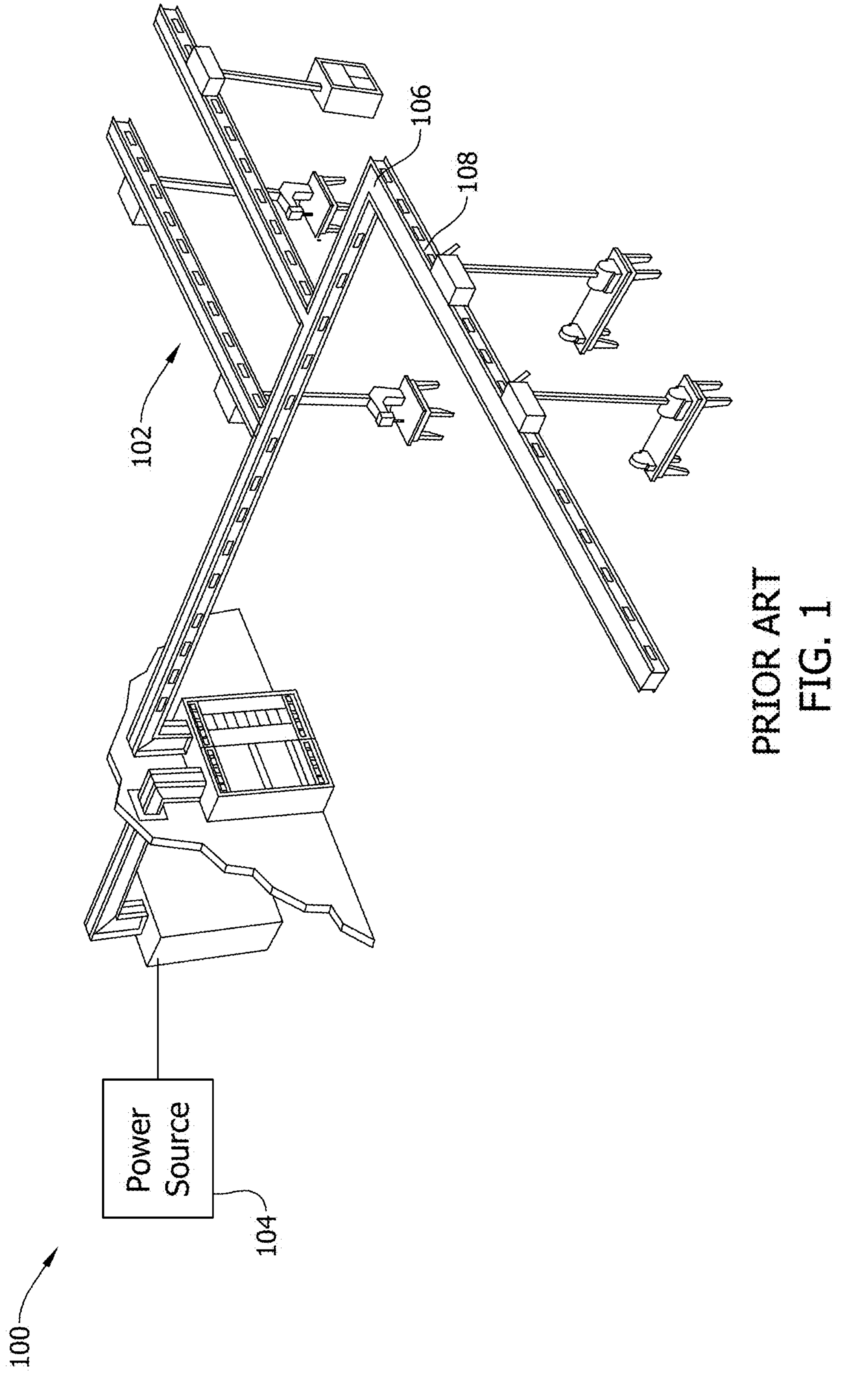
FIG. 1

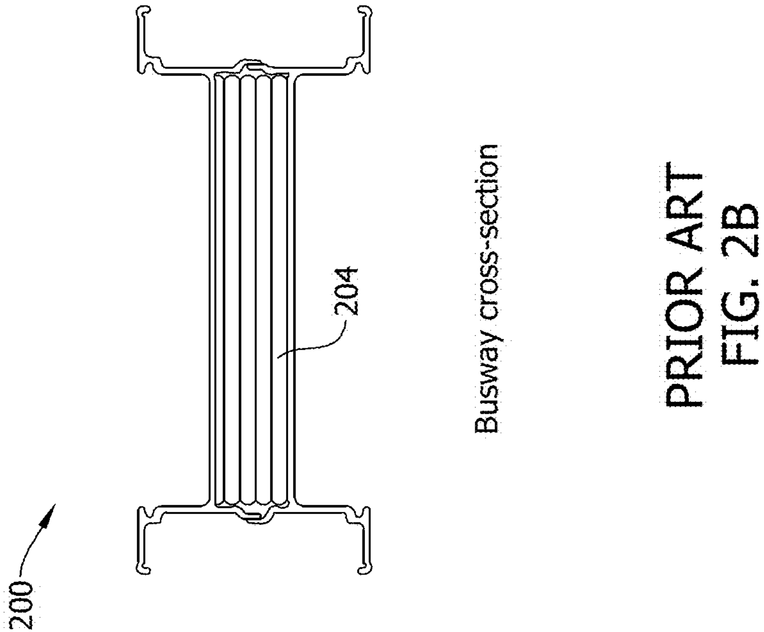
PRIOR ART
FIG. 2B
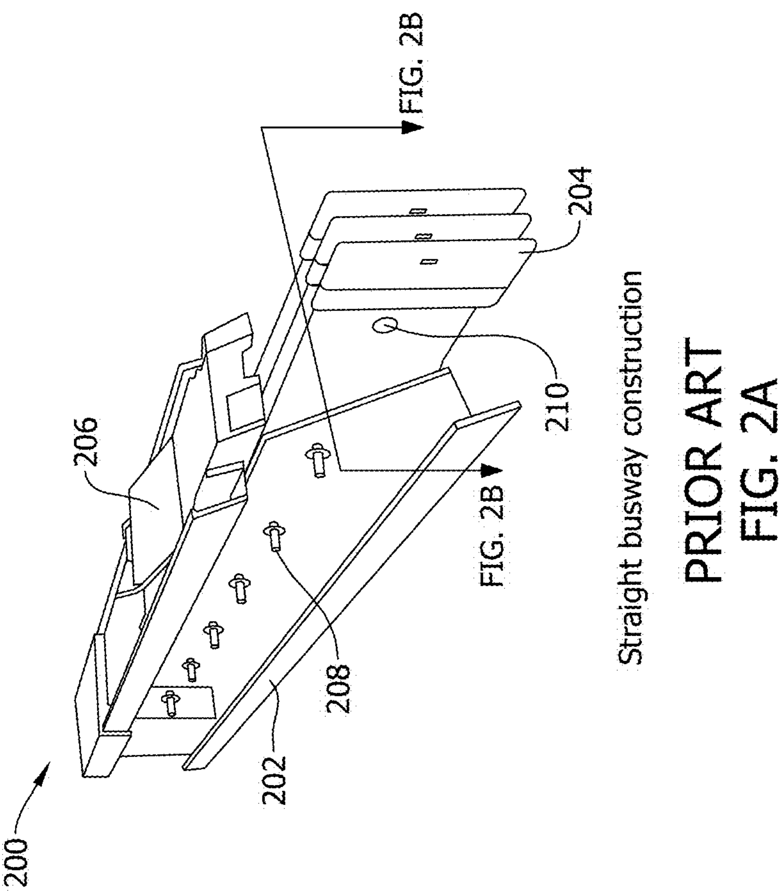
PRIOR ART
FIG. 2A

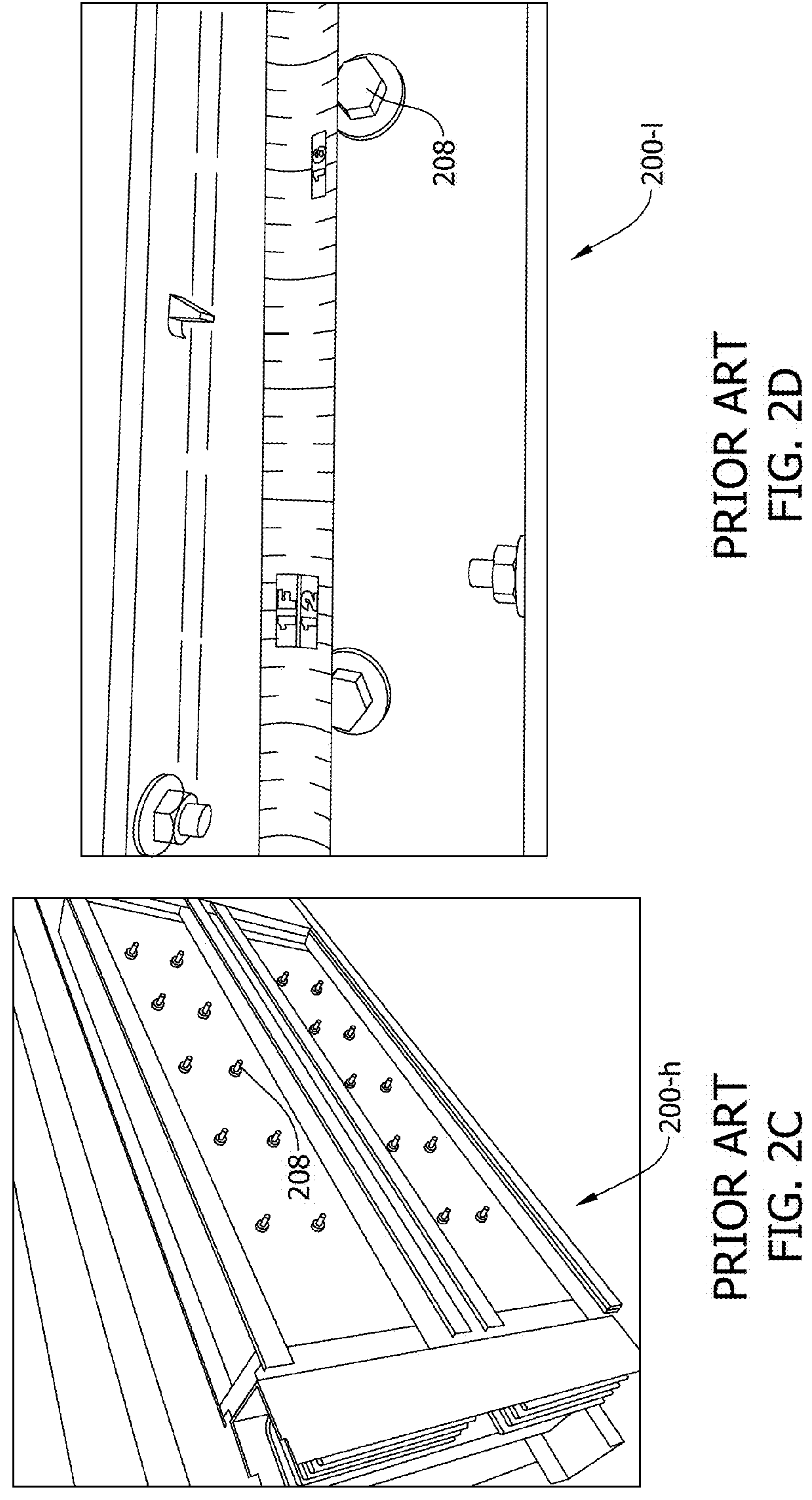
PRIOR ART
FIG. 2D
PRIOR ART
FIG. 2C

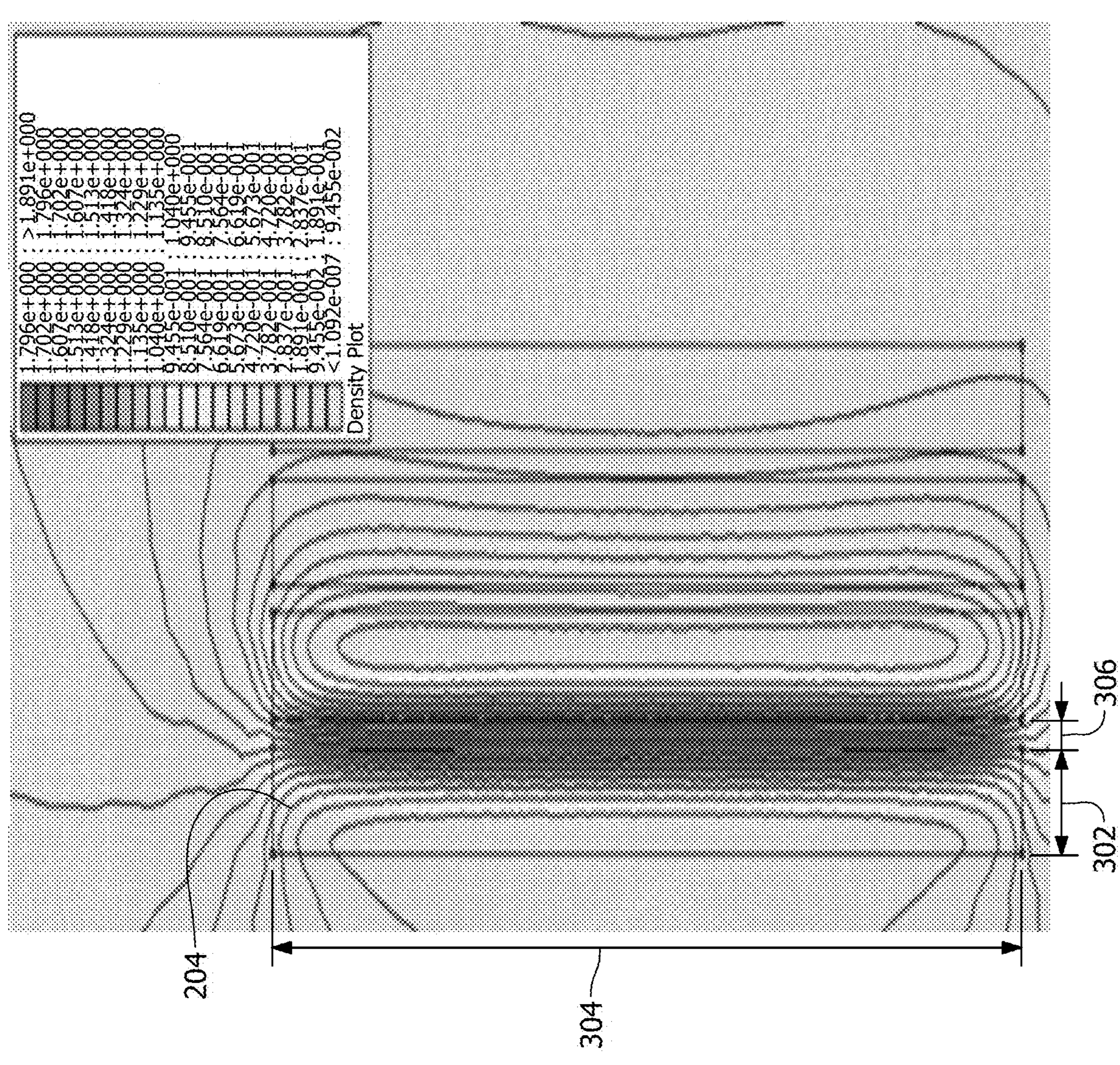
FIG. 3
Density Plot
204
304
302
306

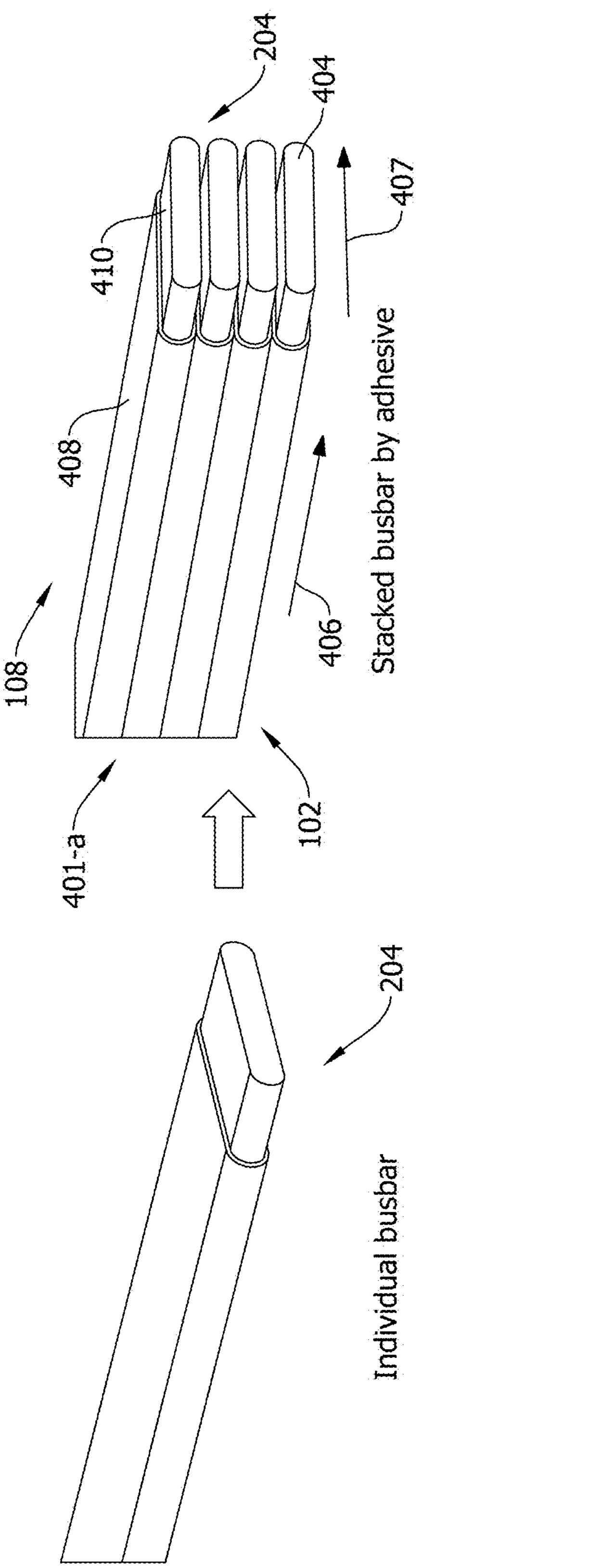
FIG. 4

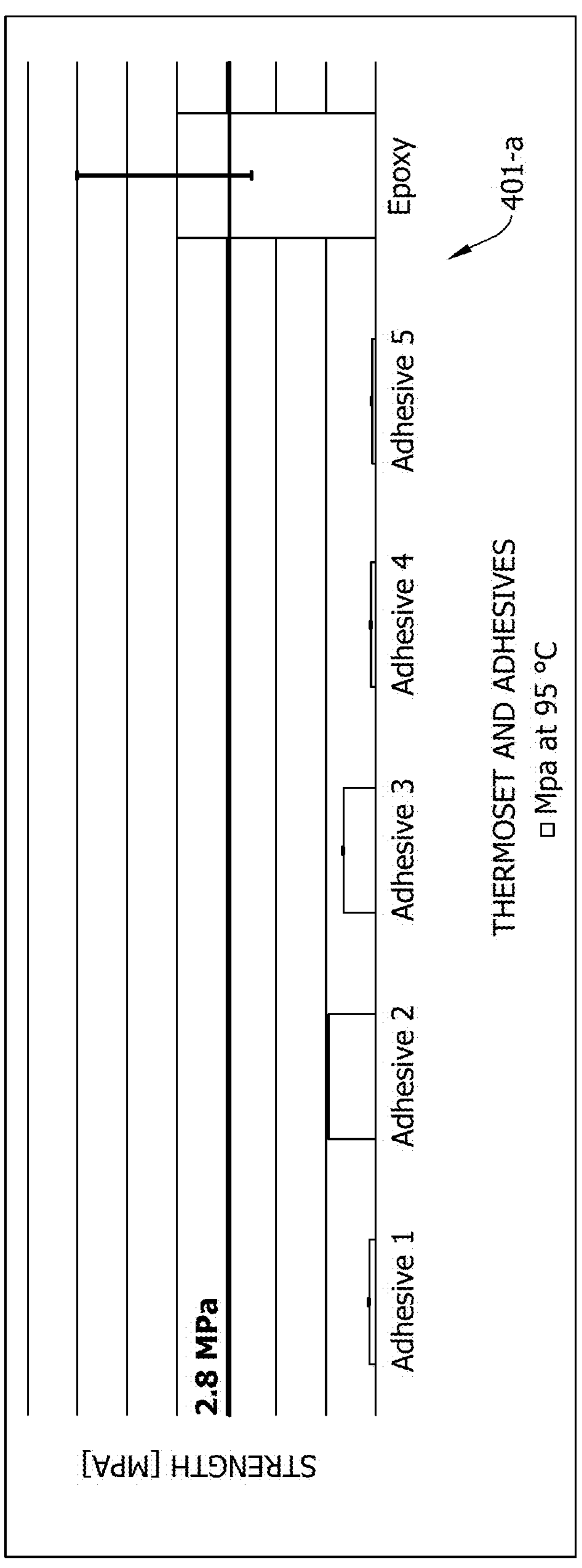
FIG. 5

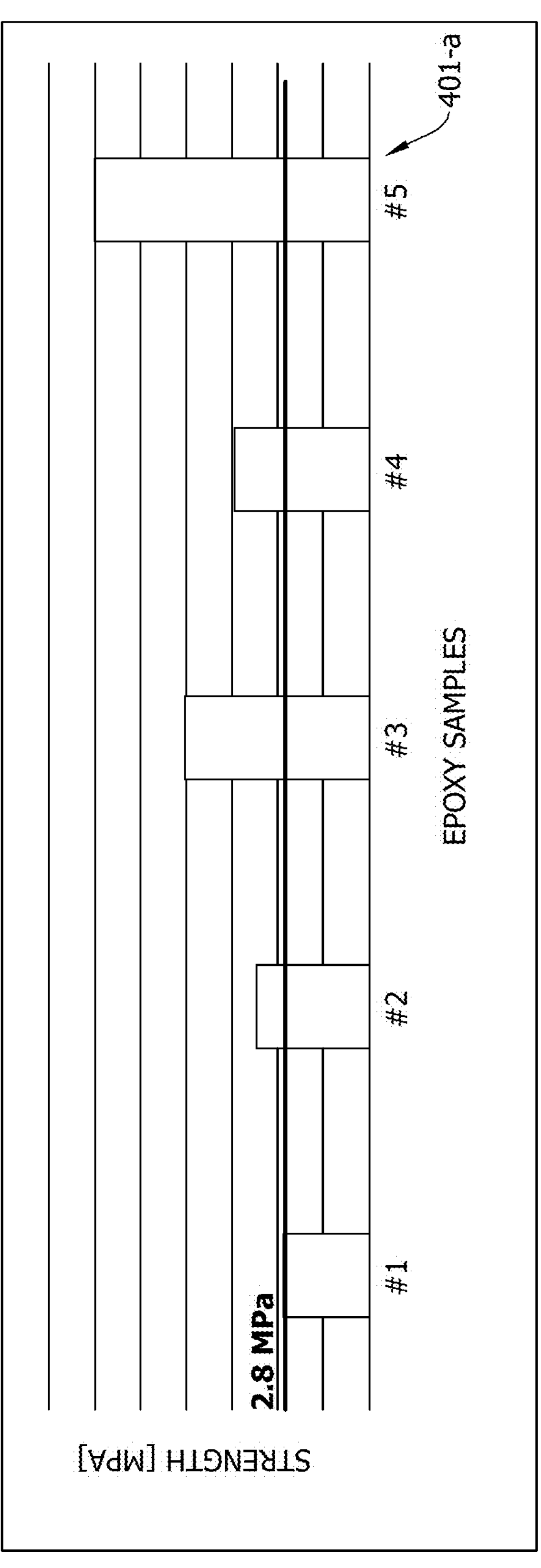
FIG. 6

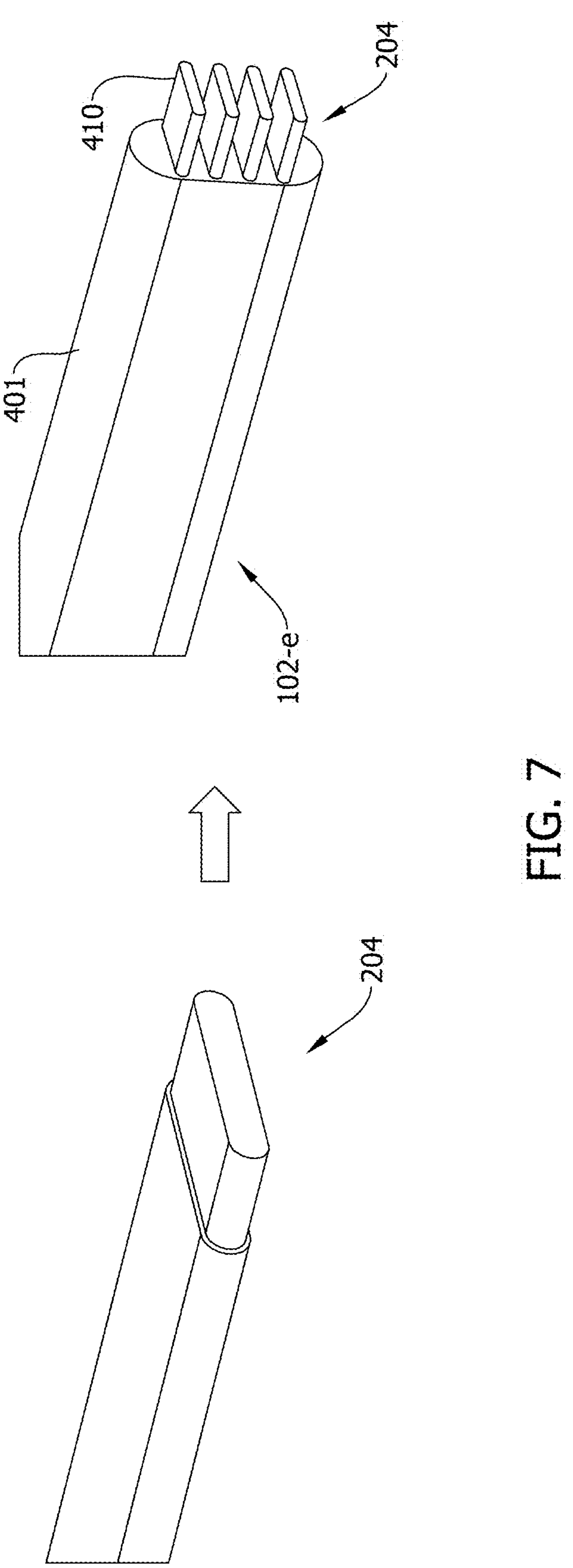
FIG. 7

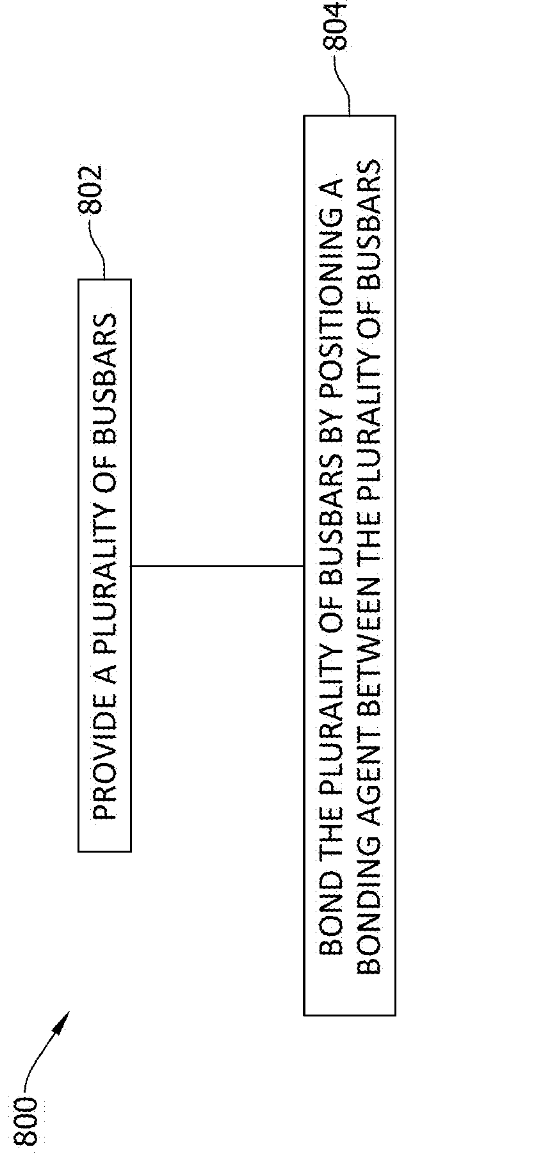
FIG. 8

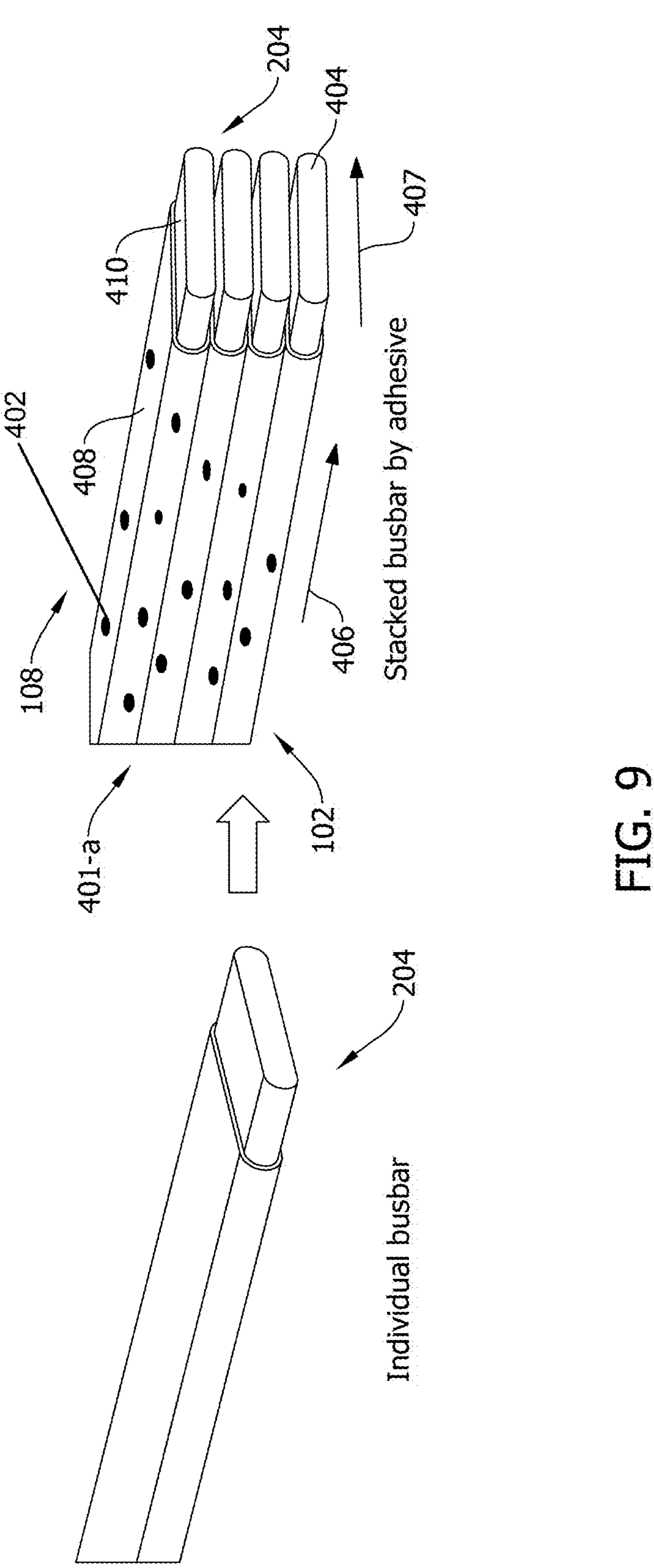
FIG. 9

ELECTRICAL BUSWAY ASSEMBLIES AND METHODS OF ASSEMBLING SAME

BACKGROUND

The field of the disclosure relates generally to electrical power delivery, and more particularly, to electrical busway assemblies and methods of assembling busway assemblies.

Electrical busway assemblies are used to distribute power from a power source to users. Known electrical busway assemblies are disadvantaged in some aspects and improvements are desired.

BRIEF DESCRIPTION

In one aspect, an electrical busway assembly is provided. The electrical busway assembly includes a plurality of busbars having a length direction. Each busbar includes a conductor and a busbar insulator coating the conductor. The busway assembly further includes a bonding agent positioned between the plurality of busbars and bonding the plurality of busbars in the length direction. The bonding agent is configured to withstand an electromagnetic force caused by a current flowing through the plurality of busbars during a short circuit condition in the plurality of busbars. The plurality of busbars are coupled with one another without mechanical fasteners, and the busway assembly has a voltage rating in a low voltage range of 1000 Volts (V) or lower.

In another aspect, a method of assembling an electrical busway assembly is provided. The method includes providing a plurality of busbars having a length direction, each busbar including a conductor and a busbar insulator coating the conductor. The method further includes bonding the plurality of busbars in the length direction via a bonding agent by positioning the bonding agent between the plurality of busbars. The bonding agent is configured to withstand an electromagnetic force caused by a current flowing through the plurality of busbars during a short circuit condition in the plurality of busbars. The plurality of busbars are coupled with one another without mechanical fasteners, and the busway assembly has a voltage rating in a low voltage range of 1000 V or lower.

DRAWINGS

These and other features, aspects, and advantages of the present disclosure will become better understood when the following detailed description is read with reference to the accompanying drawings in which like characters represent like parts throughout the drawings.

FIG. 1 is a schematic diagram of an electricity busway system.

FIG. 2A is a perspective view of a known busway assembly.

FIG. 2B is a cross-sectional view of the busway assembly shown in FIG. 2A.

FIG. 2C shows a known high ampacity busway assembly.

FIG. 2D shows a known low ampacity busway assembly.

FIG. 3 is a plot depicting electromagnetic force in standard busbars during a short-circuit event based on a computer simulation.

FIG. 4 shows an example busway assembly.

FIG. 5 shows tensile strength of adhesives.

FIG. 6 shows tensile strength of epoxy adhesives.

FIG. 7 shows another example busway assembly.

FIG. 8 is a flow chart of an example method of assembling a busway assembly shown in FIGS. 1 and 3-7.

FIG. 9 shows an additional example busway assembly.

DETAILED DESCRIPTION

The disclosure includes electrical busway assemblies that do not include mechanical fasters to couple the busbars together and methods of assembling busway assemblies. Busway assemblies rated for 1000 Amperes (A) are used for illustration purposes only. The assemblies and methods described herein may be applied to bus assemblies rated below or above 1000 A. Method aspects will be in part apparent and in part explicitly discussed in the following description.

FIG. 1 is a schematic diagram of an example electrical busway system 100. In the example embodiment, electrical busway system 100 includes electrical busway assembly 102. Power is delivered in three stages, which include a generation stage, a transmission stage, and a distribution stage. Electric power produced by power plants (the generation stage) is transmitted through transmission lines (the transmission stage), and distributed to customers such as homes, offices, and industrial facilities through distribution systems, such as electrical busway systems 100 (the distribution stage). As a result, power is distributed from a power source 104 via electrical busway systems 100 along busways 108 to a facility.

FIGS. 2A-2D show a known busway assembly 200. FIG. 2A is a perspective view of known busway assembly 200 with part of a housing 202 removed. FIG. 2B is a cross-sectional view of known busway assembly 200 along the cross-sectional line shown in FIG. 2A. FIG. 2C shows a high ampacity known busway assembly 200-*h*. FIG. 2D shows a low ampacity known busway assembly 200-*l*. Known busway assembly 200 includes busbars 204 and connectors 206. Busbars 204 are enclosed in housing 202. Housing 202 is fabricated with aluminum. Typically four busbars 204 are included in a busway assembly, where three of the busbars are for each of the three phases and the fourth one is for the neutral line. When current flows through busbars, electromagnetic forces are produced among busbars 204, repelling busbars 204 away from one another. When a short circuit condition occurs, the electromagnetic force may increase by 100 times due to the relatively large short-circuit current, presenting a risk of explosion from the relatively strong electromagnetic force. For safety and system performance, known busway assembly 200 includes bolts 208 to secure busbars with housing 202. As such, busbars 204 remain contained inside housing 202 during the short circuit condition. To install bolts 208, through holes 210 are prepunched and bolts are installed to assemble busbars 204 with housing 202. As shown in FIGS. 2C and 2D, rows or double rows of bolts 208 are needed to provide the sufficient mechanical strength to withstand the electromagnetic force, increasing installation complexity and the costs of labor and materials.

Securing busbars using bolts 208 in known busway assembly 200 presents problems. Firstly, the assembly requires additional materials from bolts 208 and housing 202 and installation requires manual labors, incurring costs from materials and labor and increasing the lead time. Secondly, bolts 208 pose as failure points during short circuit events. Further, water and moisture may enter into housing 202 through the gaps between bolts 208 and holes 210 on housing 202, corroding busbars 204. Known busway assembly 200 may be installed in a harsh and hazardous environment. Corrosive environmental elements may also enter housing 202 through the gaps, worsening the corrosion.

In contrast, assemblies and methods described herein provide busway assemblies that do not include bolts, thereby eliminating the problems associated with bolts in known busway assemblies. Assemblies and methods described herein bond busbars together using a bonding agent. The bonding agent may be an adhesive or encapsulate the busbars. When busbars are encapsulated, housing is obviated, reducing costs from material and labor.

In the example embodiments, the bonding agent is chosen to withstand the electromagnetic force from the current flowing through the busbars, even during a short circuit event. A finite element analysis is performed to estimate the electromagnetic repulsion force between busbars when a short circuit condition occurs. FIG. 3 shows results of the analysis. In the analysis, each busbar 204 has a thickness 302 of ¼" (0.6 cm), a width 304 of 3⅜" (8.6 cm), and a spacing 306 of approximately 65 thousandths of an inch (1.65 mm) from the immediately adjacent busbar 204. The current rating used in the analysis is at 1000 A. A peak current of 100 kA (root mean square (RMS)) is used to simulate a short circuit condition, which is the worst-case scenario for this current rating. The analysis shows that the stress from the peak electromagnetic force is approximately 2.8 MPa between neighboring busbars under a short circuit condition for a low-voltage system with a current rating of 1000 A, with the busbars at the specific configuration described above. The peak electromagnetic force is used to design and choose a bonding agent 401 to bond busbars 204 together, instead of using bolts 208.

In operation, a finite element analysis may be performed to account for different current ratings and busbar configurations corresponding to the current ratings. For example, if the current rating is 600 A, the width of the busbar may be approximately 6" (15.2 cm). The analysis is performed with the corresponding dimensions and current level to derive the peak electromagnetic force.

FIG. 4 shows an example busway assembly 102 assembled with bonding agent 401. In the example embodiment, bonding agent 401 includes an adhesive 401-*a* or an adhesive bonding agent 401-*a*. Busbar 204 includes a conductor 404. Conductor 404 may be fabricated from aluminum, copper, aluminum alloy, or copper alloy. Conductor 404 has a length direction 406 and a width direction 407 perpendicular to length direction 406. Current flows along length direction 406. Busbar 204 further includes a busbar insulator 408. Busbar insulator 408 may include epoxy, silicone, or polyurethane. Busbar insulator 408 is coated on busbar 204, exposing ends 410 of busbar 204, which are used to connect to other busbars or conductors at locations such as joints 106 (see FIG. 1) of busways 108.

In the example embodiment, a busbar 204 are bonded with another busbar 204 along length direction 406 via adhesive 401-*a*. The adhesion force provided by adhesive 401-*a* is equal to or greater than the peak electromagnetic force, thereby withstanding the repulsion force from the current flowing through busbars 204. When adhesive 401-*a* is compatible with busbar insulator 408, the adhesion force is relatively strong. One material is compatible with another material when bonds are formed between the two materials. When the two materials are the same, the materials are compatible, where covalent bonds may be formed, thereby providing a relatively strong adhesion force. For example, if busbar insulator 408 is epoxy, adhesive 401-*a* fabricated with epoxy is compatible with busbar insulator 408. Polyurethane busbar insulator 408 is compatible with polyurethane adhesive 401-*a*. Silicone busbar insulator 408 is compatible with silicone adhesive 401-*a*. Besides being compatible, choosing an adhesive 401-*a* fabricated with the same material as busbar insulator 408 is advantageous in simplifying manufacturing processes, where the same manufacturing process may be used in coating busbar insulator 408 onto busbar 204 and bonding busbars via adhesive 401-*a*. For example, epoxy busbar insulator 408 is coated onto conductor 404 by spraying epoxy powder onto conductor 404. Epoxy adhesive 401-*a* may be applied to busbar 204 also by spraying epoxy powder onto busbar 204. In addition, a hydrophobic material is likely compatible with another hydrophobic material. A hydrophilic material is likely compatible with another hydrophilic material. FIG. 5 shows a plot of tensile strength, or force per surface area present during deformation, of various types of adhesives 401-*a*. Among double-sided tape adhesives (e.g., a polyurethane tape adhesive) and epoxies, adhesives fabricated with epoxy have a tensile strength greater than 10 MPa at 95° C. when busbar insulator 408 is also fabricated with epoxy. The epoxy may be LINQSOL™ BCP-15004 or BCP-1000 by CAPLINQ Corporation.

In the example embodiment, thickness of adhesive 401-*a* may be adjusted to yield desired adhesion force. FIG. 6 shows tensile strength of various samples of epoxy adhesives 401-*a*. A thicker adhesive provide stronger adhesion until reaching a maximum thickness at which the adhesive strength will no long increase. The thickness of an adhesive, however, is limited by the standards. For example, the spacing 306 between busbars 204 may be 1.65 mm for a low-voltage system. Increasing thickness also reduce thermal conductivity of busway 108 because adhesive 401-*a* is relatively thermally insulative. An optimal thickness may be chosen based on the adhesion force and the thermal dissipation requirements. Tests show that an optimized thickness of 0.1-1 millimeter (mm) provides a sufficient adhesion force to withstand stress of 2.8 MPa for busways rated at 1000 A in a low-voltage system, without compromising the heat dissipation of busway 108. The optical thickness of 0.1-1 mm applies to busways rated up to 6000 A because the surface area of busbar 204 increases as the current rating increases and stress from electromagnetic force remains approximately the same due to the increase in the surface area although the electromagnetic force increases with the increase in current.

Adhesives providing relatively low adhesion forces may be used for relatively low short current ratings. For example, a polyurethane adhesive may have an adhesion tensile strength of approximately 1-2 MPa and may be used in busbars having a current rating less than 1000 A. In another example, double-sided adhesive tapes yield an adhesion tensile strength less than 1 MPa and may be used in busbars having a current rating further lower than 1000 A. Compared to epoxy adhesives, polyurethane adhesives and double-sided adhesive tapes are advantageous because curing is not needed, thereby shortening the cycle time in manufacturing. Polyurethane adhesive and double-sided adhesive tapes are easier to apply than epoxy adhesives. Further, due to the greater thermal conductivity, polyurethane adhesives and double-sided adhesive tapes have better thermal performance than epoxy adhesives.

Replacing bolts with adhesives in busway assemblies is not an obvious option for a person in the field in achieving boltless busway assemblies, for the concerns about the strength of adhesives, degradation of the adhesives from environmental factors, and the need of a new process of curing in manufacturing with epoxy adhesives. The assemblies and methods described herein address the concerns by analyzing the strength needed under short circuit current rating, testing the strength of the adhesive, and choosing material that has been used in electrical applications, such as transformers, as the adhesive. Busway assemblies having an adhesive such as epoxy as a bonding agent is advantageous in strengthening the bonding between busbars using a curing process. For example, in assembling a busway assembly 102, busbars 204 are coated with epoxy busbar insulator 408. Coated busbars are cured for example, by being placed in an oven, only partially before the bonding agent is applied. Epoxy adhesive 401-*a* is positioned on the partially cured busbars. The assembled busbars via adhesive 401-*a* are then placed in the oven to be fully cured. As a result, the adhesion force is increased due to the covalent bonds between molecules of adhesive 401-*a* and molecules of busbar insulator 408 formed during the curing process. In some embodiments, coated busbars are fully cured before epoxy adhesive 401-*a* are applied and cured.

FIG. 7 shows another example busway assembly 102-*e*. In the example embodiment, compared to busway assembly 102 shown in FIG. 4, busbars 204 are encapsulated in bonding agent 401. Adhesive bonding agent 401-*a* provides limited bonding force between busbars 204 because the bonding relies on one interface between two neighboring busbars and is limited by the thickness of adhesive 401-*a*, which in turn is limited to the thickness stipulated by the standards and by the consideration of thermal dissipation. Busbars 204 are not completely encapsulated with bonding agent 401. Instead, ends 410 are not coated or covered by bonding agent 401, such that busbars 204 may be electrically coupled with other busbars 204 or conductors. Encapsulating busbars 204 increases the bonding strength. Bonding agent 401 may be molded onto busbars 204. For example, busbars 204 are placed in a mold, and bonding agent 401 is introduced into the mold by mechanisms such as potting, extrusion, or compression molding. Busway assembly 102 may be molded with connectors (not shown) included in busway assembly 102. For example, busbars 204 and connectors are placed in a mold, and bonding agent 401 is introduced into the mold. After molding, busway assembly 102 may be cured, further strengthening the bonding between busbars 204.

In the example embodiment, bonding agent 401 may be fabricated from an organic material. Organic bonding agent 401 is advantageous over an inorganic bonding agent because molecular chains in an organic bonding may be manipulated and mechanic strength may be increased by forming covalent bonds between molecules via processes such as curing. Bonding agent 401 may be thermoset, where the material maintains the general geometry when heated. Example thermoset materials are polyester, epoxies, bulk molding compound (BMC), and phenolics. The polymer may be a single polymer or a mixture of thermosetting polymers. In some embodiments, bonding agent 401 includes thermoplastic heat-shrink material. The geometry of thermoplastic material changes under heat. Thermoplastic heat-shrink material may ease manufacturing because of the readiness in changing the geometry. Mechanical strength of thermoplastic bonding agent 401 may be increased by increasing the thickness of the thermoplastic bonding agent 401. Encapsulated busway assembly 102 is advantageous in providing increased electrical insulation between busbars 204 and increased environmental protection of busbars 204 from environmental corrosion.

In some embodiments (as shown in FIG. 9), bonding agent 401 may include particles 402 that have relatively high thermal conductivity, thereby increasing the thermal conductivity of the busway assembly. The particles 402 have a thermal conductivity higher than that of busbar insulator 408. The particles 402 may have a thermal conductivity of 0.5 W/m·K or higher. Bonding agent 401 including particles 402 may increase the thermal conductivity of busway assembly 102 five times or more. For example, epoxy has a thermal conductivity of approximately 0.2 W/m·K, while a busway assembly 102 with a bonding agent 401 including particles 402 may have a thermal conductivity of 1 to 2 W/m·K. A busway with increased thermal conductivity is advantageous in thermal dissipation, especially under short circuit conditions. For low voltage busway assemblies, the particles 402 may have a dimension that is equal to, or less than, the spacing between busbars 204, thereby maintaining the desired spacing between busbars. Particles 402 may be 90% or less of bonding agent 401 by weight, thereby increasing the thermal conductivity of the busway assembly while maintaining the bonding force provided by bonding agent 401 at a magnitude sufficient to withstand the electromagnetic force caused by a short circuit current. In some embodiments, particles 402 are 40%-60% by volume of bonding agent 401, where the particles 402 are generally in contact with one another, thereby maximally increasing the overall thermal conductivity of bonding agent 401 without compromising the bonding force or manufacturing process. When particles 402 are more than 60% by volume of bonding agent 401, the particles 402 may be crowded, compromising the tensile strength of bonding agent 401 and complicating the manufacturing process. Example particles 402 are glass, beads, or carbon fiber. Bonding agent 401 with particles 402 may reduce assembling complexity by providing the desired spacing between busbars 204, where particles 402 have a dimension approximately the same as the desired spacing between busbars 204. As such, busbars 204 may be assembled all at once to meet the specification on the spacing, instead of bonding two busbars at a time. Bonding agent 401 with particles 402 remain electrically insulative, thereby providing electrical insulation between busbars 204. Particles 402 may be electrically insulative. In some embodiments, particles 402 are electrically semiconductive or electrically conductive.

Encapsulated busway assembly 102 is advantageous in thermal performance than known busway assembly 200. Encapsulation removes air gaps between busbars, thereby providing improved thermal contact between busbars 204, because air has a relatively low thermal conductivity of approximately 0.02 W/m·K.

A person in the field may be deterred from considering encapsulating busway assembly because a different manufacturing mechanism needs to be designed, a mold is needed, extra time is needed for curing of bonding agent, and the bonding agent may be degraded over time. Encapsulated busway assembly 102, however, is advantageous in providing mechanically rigid and environmentally lasting housing of busbars. Unlike known busway assemblies 102, encapsulated busway assemblies described herein may not need a housing, thereby reducing the complexity of the system. Bonding agent 401 is the same material used in potting of transformers. Based on the observation that the potting material of transformers is environmentally lasting, encapsulated busway assemblies according to the assemblies and methods described herein are environmentally lasting through the lifetime of the busway assemblies. Further, compared to known busway assembly 200, which includes metal housing 202 and gaps between bolts 208 and housing 202, busway assembly 102 having bonding agent 401 is relatively resistant to corrosion.

FIG. 8 is a flow chart of an example method 800 of assembling a busway assembly. Busway assemblies may be any busway assemblies 102 described above. In the example embodiment, method 800 includes providing 802 a plurality of busbars having a length direction. Each busbar includes a conductor and a busbar insulator coating the conductor. Method 800 also includes bonding 804 the plurality of busbars in the length direction via a bonding agent by positioning the bonding agent between the plurality of busbars. The plurality of busbars are bonded without mechanical fasteners such as bolts. In one example, method 800 includes a curing process at a temperature recommended for the bonding agent and/or the busbar insulator. The bonded busbars may be installed in a metallic housing. In another example, busbars may be placed in a mold. The busbars are encapsulated by the bonding agent via molding or potting. Afterwards, the encapsulated busbars are removed from the mold. A housing may not be necessary for encapsulated busbars. The busway assembly has a voltage rating in a low voltage range of 1000 V or lower.

By eliminating mechanical fasteners such as bolts, assemblies and methods described herein are advantageous in reducing manufacturing costs because manual assembling of busway assemblies is not needed. Further, assemblies and methods described herein eliminate system failure points associated with mechanical fasteners and may improve heat dissipation, thereby improving the performance of busway assemblies.

At least one technical effect of the systems and methods described herein includes (a) boltless busway assemblies; (b) busway assemblies with busbars bonded by adhesives; (c) encapsulated busway assemblies; and (d) determining the peak electromagnetic force that a bonding agent is to withstand and choosing a bonding agent based on the peak electromagnetic force.

Example embodiments of assemblies and methods of busway assemblies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A busway assembly, comprising:
- a plurality of busbars having a length direction, each busbar separated from adjacent busbars by a space, each busbar comprising:
  - a conductor; and
  - a busbar insulator coating the conductor;
- the busway assembly further comprising:
  - a bonding agent bonded to the respective busbar insulator of at least one of the adjacent bus bars, the bonding agent positioned in the space between the adjacent busbars and configured to bond the adjacent bus bars of the plurality of busbars, the bonding agent comprising:
    - an adhesive; and
    - a plurality of particles having a dimension equal to or smaller than a spacing between the plurality of bus bars, wherein:
      - the plurality of particles are 40%-60% of the bonding agent by volume,
      - the bonding agent is configured to withstand an electromagnetic force caused by a current flowing through the plurality of busbars during a short circuit condition in the plurality of busbars, and
      - the plurality of busbars are coupled with one another without mechanical fasteners, and the busway assembly has a voltage rating in a low voltage range of 1000 Volts (V) or lower.

2. The busway assembly of claim 1, wherein the adhesive is fabricated with the same material as the busbar insulator.

3. The busway assembly of claim 1, wherein the adhesive has a thickness of 0.1-1 millimeter (mm), and the busway assembly is rated at 6000 Ampere (A) or lower.

4. The busway assembly of claim 1, wherein the adhesive comprises polyurethane and/or a double-sided adhesive tape.

5. The busway assembly of claim 1, wherein the bonding agent encapsulates the plurality of busbars along the length direction.

6. The busway assembly of claim 5, wherein the bonding agent is organic.

7. The busway assembly of claim 5, wherein the bonding agent comprises a thermoset material.

8. The busway assembly of claim 5, wherein the bonding agent comprises a thermoplastic material.

9. The busway assembly of claim 5, wherein the bonding agent comprises polyester, epoxy, a bulk molding compound, and/or a phenolic.

10. The busway assembly of claim 5, wherein the particles have a thermal conductivity of 0.5 W/m·K or higher.

11. The busway assembly of claim 5, wherein the particles are 90% of the bonding agent by weight.

12. A method of assembling a busway assembly, comprising:
- providing a plurality of busbars having a length direction, each busbar including:
  - a conductor; and
  - a busbar insulator coating the conductor; and
- bonding the plurality of busbars in the length direction via a bonding agent by:
  - positioning the bonding agent between the plurality of busbars,
- wherein the bonding agent comprises:
  - an adhesive;
  - a plurality of particles having a dimension equal to or smaller than a spacing between the plurality of bus bars, wherein:

the plurality of particles are collectively 40%-60% of the bonding agent by volume, and the bonding agent is configured to withstand an electromagnetic force caused by a current flowing through the plurality of busbars during a short circuit condition in the plurality of busbars, and the plurality of busbars are coupled with one another without mechanical fasteners, and the busway assembly has a voltage rating in a low voltage range of 1000 Volts (V) or lower.

13. The method of claim 12, wherein bonding the plurality of busbars further comprises:

partially curing the plurality of busbars;

assembling the plurality of busbars by positioning the bonding agent between the plurality of busbars; and curing the assembled plurality of busbars.

14. The method of claim 12, wherein bonding the plurality of busbars further comprises:

encapsulating the plurality of busbars with the bonding agent.

15. The method of claim 14, wherein encapsulating the plurality of busbars further comprises:

providing a mold;

positioning the plurality of busbars in the mold; and introducing the bonding agent into the mold.

16. The method of claim 12, wherein bonding the plurality of busbars further comprises:

curing the plurality of busbars.

17. The method of claim 12, further comprising:

analyzing a peak electromagnetic force caused by a current flowing through the plurality of busbars at a short current rating of the busway assembly; and selecting the bonding agent based on the peak electromagnetic force.

18. A busway assembly, comprising:

a plurality of busbars having a length direction, each busbar separated from adjacent busbars by a space, each busbar comprising:

a conductor; and a busbar insulator coating the conductor;

the busway assembly further comprising:

a bonding agent bonded to the respective busbar insulator of at least one of the adjacent bus bars, the bonding agent positioned in the space between the adjacent busbars and configured to bond the adjacent bus bars of the plurality of busbars, the bonding agent comprising:

an adhesive; and a plurality of particles having a dimension equal to or smaller than a spacing between the plurality of bus bars, wherein the plurality of particles are 40%-60% of the bonding agent by volume.

19. The busway assembly of claim 18, wherein the particles are 90% of the bonding agent by weight.

* * * * *